US00RE45422E

(19) United States
(12) Reissued Patent
Beckman

(10) Patent Number: US RE45,422 E
(45) Date of Reissued Patent: Mar. 17, 2015

(54) ORGANIZATIONAL VIEWING TECHNIQUES

(71) Applicant: Christopher Vance Beckman, New Haven, CT (US)

(72) Inventor: Christopher Vance Beckman, New Haven, CT (US)

(73) Assignee: Loughton Technology, L.L.C., Wilmington, DE (US)

(21) Appl. No.: 13/728,893

(22) Filed: Dec. 27, 2012

Related U.S. Patent Documents

Reissue of:
(64) Patent No.: 7,859,539
Issued: Dec. 28, 2010
Appl. No.: 11/507,975
Filed: Aug. 21, 2006

U.S. Applications:
(60) Provisional application No. 60/808,814, filed on May 27, 2006.

(51) Int. Cl.
*G06T 15/00* (2011.01)
*G06F 17/30* (2006.01)
*G06F 3/01* (2006.01)

(52) U.S. Cl.
CPC ..... *G06F 17/30* (2013.01); *G06F 3/011* (2013.01)
USPC ..... 345/473; 382/103; 382/118; 707/736; 707/758; 707/741; 707/748; 707/805; 715/273; 345/474; 345/475; 725/38; 725/44; 725/45

(58) Field of Classification Search
CPC ..... G06F 17/30716; G06F 3/011–3/017; G06K 9/00248–9/00597
USPC ..... 345/473, 474, 475; 707/736, 741, 748, 707/805, 758; 725/38, 44, 45; 382/103, 382/118; 715/273
See application file for complete search history.

(56) References Cited

U.S. PATENT DOCUMENTS

| | | | |
|---|---|---|---|
| 1,859,492 | A | 5/1932 | Balestra |
| 2,577,114 | A | 12/1951 | Eames |
| 3,019,548 | A | 2/1962 | Nadler |
| 3,104,490 | A | 9/1963 | Cornell |
| 3,343,774 | A | 9/1967 | Pryor |
| 4,391,427 | A | 7/1983 | Foresman |
| 4,418,333 | A | 11/1983 | Schwarzbach |
| 4,611,295 | A | 9/1986 | Fowler |
| 4,775,124 | A | 10/1988 | Hicks |
| 4,782,420 | A | 11/1988 | Holdgaard-Jensen |

(Continued)

OTHER PUBLICATIONS

Heinzmann et al, 3-D facial Pose and gaze-Point Estimatin using a Robust Real-Time Tracking Paradigm, pp. 1-6, 1998.*

(Continued)

*Primary Examiner* — Phu K Nguyen
(74) *Attorney, Agent, or Firm* — Stolowitz Ford Cowger LLP

(57) ABSTRACT

Annotation techniques are provided. In one aspect, a method for processing a computer-based material is provided. The method comprises the following steps. The computer-based material is presented. One or more portions of the computer-based material are determined to be of interest to a user. The one or more portions are annotated to permit return to the one or more portions at a later time. In another aspect, a user interface is provided. The user interface comprises a computer-based material; a viewing focal area encompassing a portion of the computer-based material; and one or more indicia associated with and annotating the portion of the computer-based material.

74 Claims, 4 Drawing Sheets

(56) References Cited

U.S. PATENT DOCUMENTS

| | | | | |
|---|---|---|---|---|
| 4,993,546 | A | 2/1991 | Southard | |
| 5,020,753 | A | 6/1991 | Green | |
| 5,029,802 | A | 7/1991 | Ali | |
| 5,181,606 | A | 1/1993 | Martell | |
| 5,368,268 | A | 11/1994 | Jodwischat | |
| 5,417,397 | A | 5/1995 | Harnett | |
| 5,642,871 | A | 7/1997 | Repert | |
| 5,680,929 | A | 10/1997 | Von Seidel | |
| 6,152,294 | A | 11/2000 | Weinberg | |
| 6,340,864 | B1 | 1/2002 | Wacyk | |
| 6,351,813 | B1 | 2/2002 | Mooney et al. | |
| 6,396,166 | B1 | 5/2002 | Kim | |
| 6,552,888 | B2 | 4/2003 | Weinberger | |
| 6,763,388 | B1 * | 7/2004 | Tsimelzon | 709/228 |
| 6,828,695 | B1 | 12/2004 | Hansen | |
| 6,956,593 | B1 | 10/2005 | Gupta et al. | |
| 6,957,233 | B1 | 10/2005 | Beezer et al. | 1/1 |
| 6,966,445 | B1 | 11/2005 | Johanna | |
| 6,992,687 | B1 | 1/2006 | Baird et al. | |
| 7,020,663 | B2 | 3/2006 | Hay | |
| 7,181,679 | B1 * | 2/2007 | Taylor | 715/234 |
| 7,234,104 | B2 * | 6/2007 | Chang et al. | 715/202 |
| 7,234,108 | B1 * | 6/2007 | Madan | 715/223 |
| 7,257,774 | B2 * | 8/2007 | Denoue et al. | 715/719 |
| 7,388,735 | B2 | 6/2008 | Chen | |
| 7,411,317 | B2 | 8/2008 | Liu | |
| 7,418,656 | B1 * | 8/2008 | Petersen | 715/230 |
| 7,447,771 | B1 * | 11/2008 | Taylor | 709/225 |
| 7,460,150 | B1 * | 12/2008 | Coughlan et al. | 348/169 |
| 7,496,765 | B2 | 2/2009 | Sengoku | |
| 7,505,237 | B2 | 3/2009 | Baxter | |
| 7,506,246 | B2 | 3/2009 | Hollander | |
| 7,594,187 | B2 * | 9/2009 | Baird et al. | 715/805 |
| 7,650,565 | B2 * | 1/2010 | Ford, III | 715/230 |
| 7,716,224 | B2 * | 5/2010 | Reztlaff et al. | 707/741 |
| 7,738,684 | B2 * | 6/2010 | Kariathungal et al. | 382/128 |
| 7,778,954 | B2 | 8/2010 | Rhoads | |
| 7,783,077 | B2 * | 8/2010 | Miklos et al. | 382/103 |
| 7,783,979 | B1 * | 8/2010 | Leblang et al. | 715/739 |
| 7,800,251 | B2 | 9/2010 | Hodges | |
| 7,810,042 | B2 * | 10/2010 | Keely et al. | 715/776 |
| 7,821,161 | B2 | 10/2010 | Beckman | |
| 7,859,539 | B2 | 12/2010 | Beckman | |
| 7,889,464 | B2 | 2/2011 | Chen | |
| 7,940,250 | B2 * | 5/2011 | Forstall | 345/173 |
| 7,999,415 | B2 | 8/2011 | Beckman | |
| 8,000,074 | B2 | 8/2011 | Jones | |
| 8,004,123 | B2 | 8/2011 | Hodges | |
| 8,006,387 | B2 | 8/2011 | Watts | |
| 8,028,231 | B2 * | 9/2011 | Jeffery et al. | 715/710 |
| 8,209,605 | B2 * | 6/2012 | Poston et al. | 715/273 |
| 8,302,202 | B2 | 10/2012 | Dawson | |
| 8,332,742 | B2 * | 12/2012 | Taylor | 715/208 |
| 8,410,639 | B2 | 4/2013 | Beckman | |
| 8,631,009 | B2 * | 1/2014 | Lisa et al. | 707/736 |
| 2001/0016895 | A1 | 8/2001 | Sakajiri et al. | |
| 2003/0050927 | A1 | 3/2003 | Hussam | |
| 2003/0135520 | A1 | 7/2003 | Mitchell | |
| 2005/0055405 | A1 | 3/2005 | Kaminsky | |
| 2005/0066069 | A1 | 3/2005 | Kaji | |
| 2005/0182973 | A1 | 8/2005 | Funahashi | |
| 2005/0193188 | A1 | 9/2005 | Huang | |
| 2006/0107062 | A1 | 5/2006 | Fauthoux | |
| 2006/0163344 | A1 | 7/2006 | Nwosu | |
| 2006/0173819 | A1 | 8/2006 | Watson | |
| 2006/0176146 | A1 | 8/2006 | Krishan | |
| 2006/0206120 | A1 | 9/2006 | Harada et al. | |
| 2006/0226950 | A1 | 10/2006 | Kanou et al. | |
| 2006/0273663 | A1 | 12/2006 | Emalfarb | |
| 2007/0006322 | A1 | 1/2007 | Karimzadeh | |
| 2007/0016941 | A1 | 1/2007 | Gonzalez | |
| 2007/0045417 | A1 | 3/2007 | Tsai | |
| 2008/0086680 | A1 | 4/2008 | Beckman | |
| 2008/0088293 | A1 | 4/2008 | Beckman | |
| 2008/0092219 | A1 | 4/2008 | Beckman | |
| 2011/0012580 | A1 | 1/2011 | Beckman | |
| 2011/0298303 | A1 | 12/2011 | Beckman | |
| 2013/0175880 | A1 | 7/2013 | Beckman | |

OTHER PUBLICATIONS

Kim et al, vision-Based Eye-Gaze Tracking for Human Computer Interface, IEEE, pp. 24-329, 1999.*

Fono et al, EyeWindows: Evaluation of Eye-Controlled Zooming Windows for Focus Selection, CHI_2005, pp. 151-160, 2005.*

Jacob, The Use of Eye Movements in Human-Computer interaction Techniques: What You Look At is What You get. ACM Transactions on Information Systems, vol. 9, No. 3, 1991, pp. 152-169.*

Stolowitz Ford Cowger LLP, "Listing of Related Cases", U.S. Appl. No. 13/728,893, dated Mar. 28, 2013, 1 page.

California Energy Commission, "Small Appliances", Mar. 6, 2001; http://www.consumterenergycenter.org/homeandwork/homes/inside/appliances/small.html; 3 pages.

Calhoun et al., "Standby Voltage for Reduced Power"; Dec. 19, 2002; 4 pages.

LexisNexis, "Shepard's Citations Review", Apr. 30, 2004; pp. 1-2.

Energyrating.gov.au, "The Leaking Electricity Initiative: an International Action to Reduce Standby Power Waste of Electrical Equipment", Jul. 9, 2005; http://www.energyrating.gov.au/library/pubs/cop5-leaking.prd; 4 pages.

SVT Technologies, "SVT Lighting Control Products", May 4, 2006; http://www.svt-tech.com/lightingcontrol.html; 1 pages.

Bits Limited, "The Leg3", Jan. 1, 2007; http://catalog/bitsltd.us/catalog/SMART/LEG3. html; 2 pages.

Lexis Nexis, "LexisNexis Citation Tools 2001", copyright 2002; LexisNexis; pp. 1-8; (discloses checking citations for positive and negative treatments).

LexisNexis, "Shepard's Citations Review", copyright 2003; pp. 1-2.

Internet Archive Wayback Machine, disclosing site retrieval for http://lexisnexis.com in 2005; 1 page.

Stolowitz Ford Cowger LLP; Related Case Listing; Feb. 10, 2014, Portland, OR; 1 page.

* cited by examiner

ORGANIZATIONAL VIEWING TECHNIQUES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue of U.S. patent application Ser. No. 11/507,975, filed Aug. 21, 2006, now U.S. Pat. No. 7,859,539, issued Dec. 28, 2010 which* claims the benefit of U.S. Provisional Application No. 60/808,814, filed May 27, 2006 *both of which are incorporated by reference herein in their entireties*.

FIELD OF THE INVENTION

The present invention relates to organizational viewing techniques, and more particularly, to organizational techniques for viewing computer-based files, documents and web pages.

BACKGROUND OF THE INVENTION

A user of a computer program conducting computer-based research will often view numerous files, documents and web pages. Typically, the user will find some of the materials viewed to be of interest and will want to return to those materials at a later time. Using current technology, the user can create hyperlinks or "shortcuts" to identify and easily return to "favorite" materials. Often, however, the user has spent considerable time reviewing the materials and has found particular parts to be of interest. Any hyperlink or shortcut will only direct the user to the material, but not to any specific part of the material.

Techniques are known that allow a user to identify "key words" that appear in a material. Using these techniques, once linked to a material, the user can perform a "key word" or "boolean" search that compares a word, or words, selected by the user to the contents of the material, and presents words or phrases within the material that match, or potentially match, the words selected by the user. However, it is likely that such a search will result in numerous matches or potential matches, many of which are not of interest to the user. Thus, the user would have to spend time reviewing previously viewed material to identify and locate specific parts of the material. This practice is inefficient.

U.S. Pat. No. 6,992,687 issued to Baird et al., entitled "Bookmarking and Placemarking a Displayed Document in a Computer System" (hereinafter "Baird") discloses a method and apparatus for bookmarking and/or placemarking a viewable part of a document, that is displayed on a computer video display at one time, allowing a user to return to that part at a later time. The bookmarking techniques of Baird, however, are limited to selecting the entire part of a document that is displayed at one time. Further, Baird requires that labor-intensive steps be undertaken to effectuate the bookmarking function and later use a bookmark created by the bookmarking function.

Therefore, improved techniques are needed for computer-based research that enable a user to easily and efficiently return to areas that are of interest.

SUMMARY OF THE INVENTION

Annotation techniques are provided. In one aspect of the present invention, a method for processing computer-based materials, such as files, documents, web pages, data spread sheets and computer displayable media, is provided. The method comprises the following steps. The computer-based material is presented. One or more portions, e.g., specific areas, lines of text, characters of text, lines of data and/or characters of data, of the computer-based material are determined to be of interest to a user. The one or more portions are annotated to permit, e.g., the user, to return to the portions at a later time.

In another aspect of the present invention, a user interface is provided. The user interface comprises a computer-based material; a viewing focal area encompassing a portion, i.e., specific areas, navigation positions, scroll positions, lines of text, characters, data or images, of the computer-based material; and one or more indicia associated with and annotating the portion of the computer-based material. Those indicia are "hyperlinked" to the particular portion of the computer-based material, allowing the user to rapidly to return to the particular portion by "clicking on" the indicia.

A more complete understanding of the present invention, as well as further features and advantages of the present invention, will be obtained by reference to the following detailed description and drawings.

DETAILED DESCRIPTION OF PREFERRED EMBODIMENTS

Figure 1:
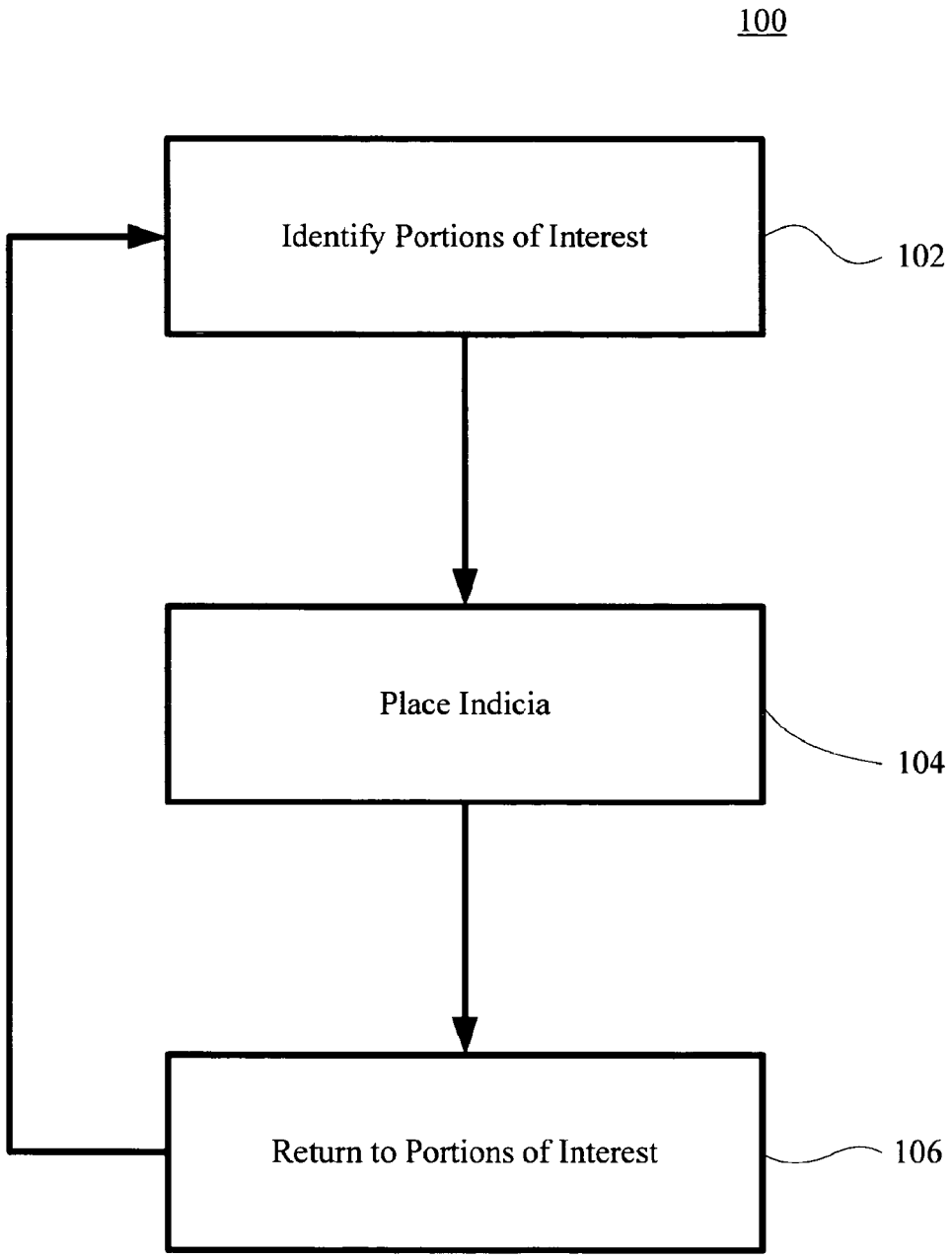
FIG. 1 is a diagram illustrating an exemplary methodology for annotating computer-based material according to an embodiment of the present invention.

FIG. 1 is a diagram illustrating exemplary methodology 100 for annotating computer-based material. The term "computer-based material" is intended to include, but is not limited to, data files, web pages (i.e., as viewed by internet navigation software), documents (e.g., of a word processing program), data spreadsheets, streaming media, as well as any other media that can be displayed on a video display, i.e., a computer screen, (collectively referred to hereinafter as "materials"). As also used herein, the term "annotate" refers to attaching indicia, i.e., link indicia, such as a label or a tag, to a specific location in a particular computer-based material to enable immediate return to such a location by clicking on the indicia at a later time. For example, according to one embodiment, the indicia may comprise one or more of indicators or link indicators. The term "clicking on" is used in its ordinary sense, as well known in the computer industry, meaning that the user employs a mouse or other similar tactile/graphical computer interface tool to place a cursor, arrow or other such viewable display item on a computer screen over another viewable display item, and then press a button of the tool, or otherwise indicates to a computer process or program that some activity by the computer is to be performed.

A detailed description of the annotation of computer-based materials, as well as embodiments of the indicia, will be provided below. As will be described in detail below, specific types of indicia are provided herein that work with existing "scroll bar" technology of various computer programs by appearing by or on specific locations of a scroll bar corresponding with (and therefore indicating location of and allowing an immediate link to) the identified portion(s) of interest in a material.

In step 102, one or more portions of a computer-based material that are of interest to a user, i.e., portions of interest, are identified. Generally, the term "portion," as used herein, refers to a part of a material that is less than the entire material, i.e., without regard to whether that part comprises a part that is displayed on the computer screen at one point in time. The portions may include, but are not limited to, specific areas, navigation positions, scroll positions, lines and characters of text, data, or images of a computer-based material, such as a file, a web page, a document, a data spreadsheet or a computer displayable media. For example, with regard to a document, a user might review the text of the document and find certain paragraphs that the user would like to return to once they no longer are displayed on the screen, or once the document has been closed. The general procedures surrounding viewing computer-based material, including opening and closing a document or a web page, are commonly known to those of skill in the art and are not described further herein.

According to the present teachings, the portions of interest to the user can be identified in the computer-based material either by automatic monitoring of the viewing behaviors of the user ("passive identification") by a computer program, or by the user actively identifying portions that the user determines to be of interest ("active identification"). These passive and active identification modes will be described in detail below.

Figure 2:
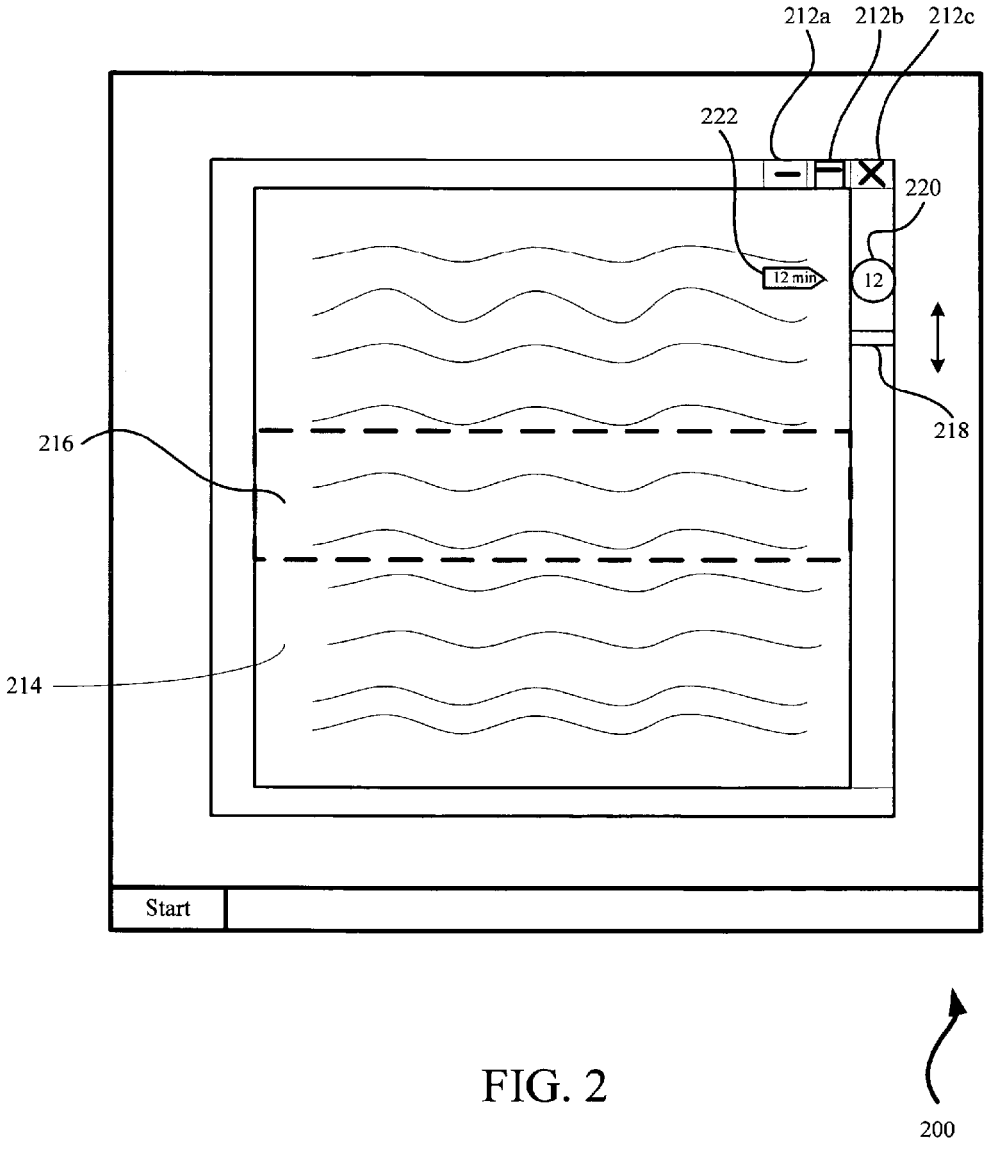
FIG. 2 is a diagram illustrating an exemplary passive identification user interface according to an embodiment of the present invention.

With the passive identification mode, a passive identification interface is provided that identifies the portions of interest in a computer-based material by the user viewing those portions for a duration greater than a threshold viewing time limit (which may be variably set by the user) or by the user returning to those portions of interest after navigating away from them, more than a preset number of times, i.e., instances. An exemplary passive identification interface is shown in FIG. 2, the use of which is described in detail below. For example, the passive identification interface provided to a user viewing a document can comprise a viewing focal area that encompasses a certain number of lines of text, characters or images, e.g., one line of text, presented in the center of the area of the computer screen that is displaying the document. According to the present techniques, the user may variably set the extent of the viewing focal area to match his or her preferences. When the user reviews a material, the user will have a natural tendency to focus his or her attention on the text, graphics, characters or other aspects of the material in the viewing focal area. The user can change the portion of the computer-based material that is present in the viewing focal area simply by using a conventional scrolling function, for example, on the well-known Microsoft Word or Internet Explorer programs. The use of such a scrolling function would be apparent to one of skill in the art and is not described in further detail herein.

When the user finds a portion of the computer-based material in the viewing focal area to be of interest, it is natural that the user will spend more time viewing that portion with little or no scrolling. Thus, that portion of the computer-based material is kept in the viewing focal area for a relatively greater length of time, as compared to areas of little or no interest. Once a portion of the computer-based material remains in the viewing focal area for greater than a predetermined amount of time (a threshold viewing time limit) an annotation, or link indicia (link indicator), is automatically attached to that portion.

The threshold viewing time limit can be predetermined by the user. For example, the user can adjust the threshold viewing time limit based on the speed at which the user reads. Thus, a user that reads at a slow pace can increase the threshold viewing time limit so that annotations are not incorrectly attached to portions of text simply because the user took longer to read the portion, but has no interest in later returning to it. Alternatively, the threshold viewing time limit can be a standard amount of time programmed in the methodology. As an alternative embodiment, the threshold viewing time limit may be variably set by the methodology as a percentage of overall time spent viewing the material, and as such, the indicia would be assigned upon exiting the material. As yet another alternative embodiment, the software could set the threshold time limit according to a percentage beyond the average viewing time for, i.e., lines of text, images or characters, for a particular user, as monitored by the methodology on an ongoing basis.

A record of the viewing time, after the threshold viewing time limit has been exceeded, can be kept, such that the identified portions of interest can later be ranked based on the amount of time the user spent viewing each portion. Annotations can then be displayed to the user based upon that ranking, allowing the user to easily and quickly return to the portions found to be of greatest interest. For example, the user might later choose to return to only those portions of each document which he or she spent the most amount of time reviewing. Alternatively, a chronological record can be kept such that the identified portions of interest can later be ranked and annotated based on when the user viewed each portion. For example, the user might wish to return first to those portions that were more recently viewed.

Additionally, a maximum viewing time limit may be imposed, beyond which any annotations or link indicia attached to a portion in the viewing focal area, i.e., once the threshold viewing time limit is exceeded, are either removed or modified. The setting of a maximum viewing time limit prevents mislabeling of portions as being of interest only because the user has diverted his or her attention away from the document, e.g., has stepped away from the computer, for a duration greater than the threshold viewing time limit. In this instance, if the annotations are removed, then the user would not be prompted to later return to that portion. If in fact the portion in the viewing window is of interest to the user, but the annotation has been removed because the maximum viewing time limit has been exceeded, the user can actively annotate that portion as described below. Alternatively, the annotation can be automatically modified by the methodology once the maximum viewing time limit has been exceeded. For example, the annotations can be modified to indicate to the user that the maximum viewing time limit has been exceeded and to allow the user to evaluate whether the portion annotated is truly of interest or not.

With the active identification mode, the user identifies portions of interest in the computer-based material using active annotations. Active annotations can be implemented in conjunction with the passive identification interface described above. For example, if the user finds a portion of a document in the viewing focal area to be of interest, but does not want to review that portion for a length of time exceeding the threshold viewing time limit, the user can actively select that portion for annotation simply by using a pointing device, such as a mouse, or a designated command from a keyboard, to select the viewing focal area and annotate the text therein.

The present techniques, however, do not require that active annotations be implemented using a viewing focal area. For example, the user can actively identify any portion of a document, viewable on the screen, for annotation by using a pointing device (e.g., a mouse) to simply "point" and "click" anywhere on the window that is displaying the portion, or by similarly using the pointing device to "click and drag" and thereby "highlight" the portion. The use of a pointing device, such as a mouse, to select text in a document by highlighting and/or by pointing and clicking on the text is well known to those of skill in the art, and is not further described herein.

According to an illustrative embodiment, if the user highlights a portion of text, the user can then be required to perform an additional step to complete annotation of that portion. By way of example only, the user can be required to initiate an annotate command function to complete annotation. The annotate command function option can be one of a number of commands presented to the user, e.g., in a drop-down menu, when the user "right-clicks" on the highlighted text. The term "right-click" means the use of a button on a computer mouse that is not the primary button of the mouse, which primary button is used for the majority of clicking tasks when using a mouse. The term "drop-down" menu refers to a user interface commonly used in Windows-style computer programs, whereby a list or group of potential commands appears on the computer screen upon the user issuing a command to the computer, as by selecting a menu item from a "tool bar." The annotate command function option can also be presented to the user as an icon placed on the screen. The user can then select the annotate command function by "clicking" on the icon.

In step 104, link indicia are attached to the identified portions of interest in the computer-based material. The term "attached to," as used herein, is intended to refer to, e.g., indicia being displayed on the screen at, near, approximate to or in a shape pointing to computer-based material, or otherwise displaying identifying information so as to label that computer-based material as being of interest. As will be described in detail below, the indicia may be "hyperlinked" to the identified portions of interest in the computer-based material, allowing the user to rapidly [to] return to the particular portion by "clicking on" the indicia. Further, the indicia can have several different forms. For example, according to one exemplary embodiment, the indicia comprise tags, visible to the user, that are displayed by the computer screen at or near the computer-based material, e.g., in the margins, in proximity to the respective portions to which each tag is attached.

The link indicia can include information useful to the user and relevant to the interests or other computer-based activities of the user. For example, as described above, each link indicia may include an amount of time the user spent reviewing the portion to which the tag is attached. As also described above, each link indicia may include chronological information indicating to the user when the portion was viewed. In addition, the user can manually insert, e.g., type, information into a tag to rank or otherwise prioritize that tag with respect to other tags, or to provide summaries or any other useful information that the user wishes to associate with portions of the computer-based material.

In step 106, the user can then return to any of the annotated portions of any of the computer-based materials using the attached indicia. This may occur in one or more ways.

Figure 3:
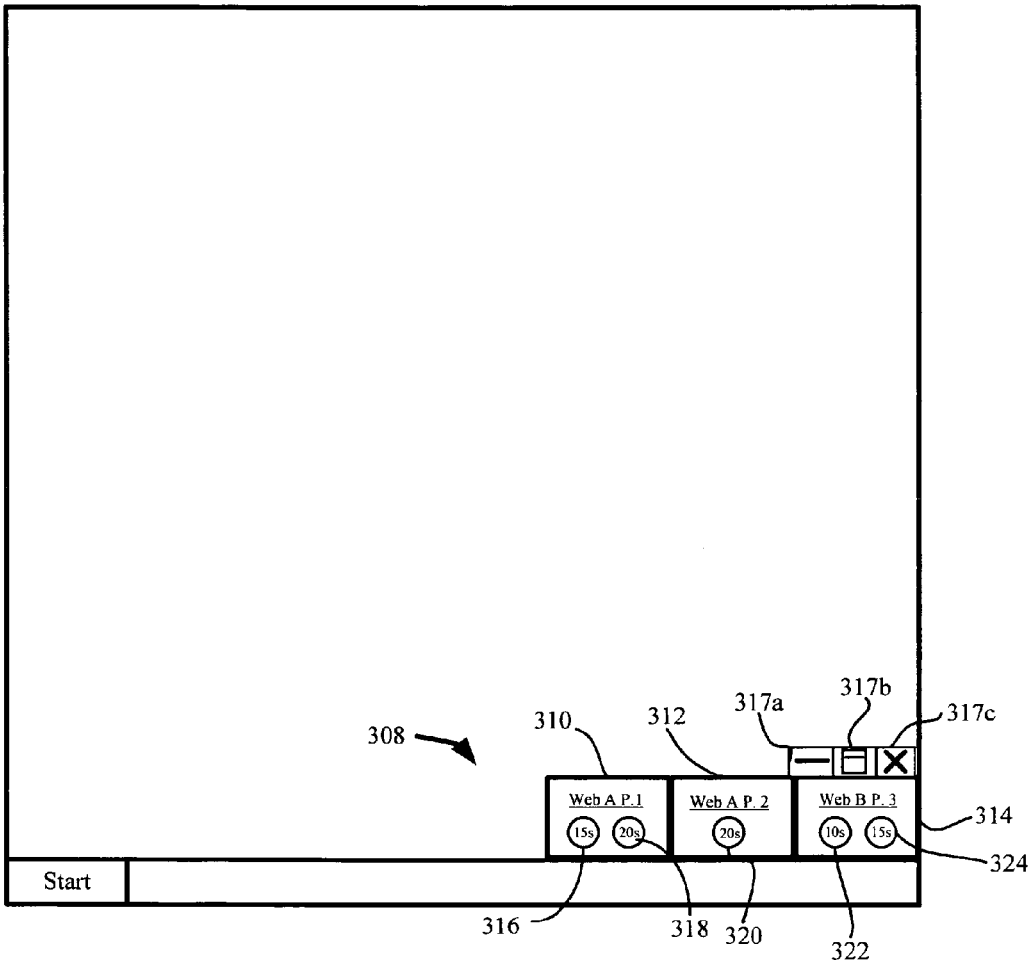
FIG. 3 is a diagram illustrating an exemplary reference key user interface according to an embodiment of the present invention.

According to one exemplary embodiment, the user returns to an annotated portion of a computer-based material using a reference key user interface. The reference key user interface provides an index of computer-based material and attached indicia. As described above, the indicia can comprise link indicators. An exemplary reference key user interface is shown in FIG. 3, and is described in detail below. The reference key user interface allows the user to return to an annotated portion of the computer-based material by selecting/clicking on the link indicator, e.g., with a pointing device, in the reference key user interface that corresponds to that portion. The reference key user interface may be implemented by a program that memorizes the location of the portion of interest, and automatically completes those steps necessary within another program that displays the material, such that the portion of interest is presented.

According to another exemplary embodiment, the user returns to an annotated portion of a computer-based material by directly viewing the link indicia present in the material and/or the link indicia over the "scroll bar" associated with the material. If the user is currently viewing a computer-based material in which the user has previously placed link indicia, the user can employ the scroll function to view the previously placed indicia, e.g., by clicking on the link indicator placed along the scroll bar, existing programs will automatically navigate to the annotated portion of interest associated with the link indicia. If the program associated with the material does not utilize a conventional scroll bar, the user may manually scroll through the material until link indicia appear, to identify and return to portions of interest. For example, if a user is viewing a two-page document and annotates several portions of interest on the first page, indicia will appear in the margins of the first page. If the user then moves on to view the second page, but decides to return to those portions of interest on the first page, the user can simply scroll the document back to the first page and search for the desired indicia.

FIG. 2 is a diagram illustrating exemplary passive identification interface 200. Passive identification interface 200 comprises computer-based material 214, viewing focal area 216, scroll bar 218, indicia 220 and 222 and control keys 212a, 212b and 212c. As described above, the indicia may comprise link indicators.

Computer-based material 214 includes, but is not limited to, files, documents or web pages containing text, images, data, graphical representations, figures, icons and media files. For example, computer-based material 214 can comprise a document including text or a web page including images.

Viewing focal area 216 typically comprises a subsection of passive identification interface 200 encompassing a portion of computer-based material 214. For example, as described above, when computer-based material 214 comprises a document, viewing focal area 216 may encompass five lines of text in the middle of the viewable portion of the document. Alternatively, and also if computer-based material 214 comprises a document, viewing focal area 216 can be positioned in the middle of the viewable area of the document based on a median character, word, sentence or paragraph in the document. Specifically, an averaging function can be employed to determine the median character, word, sentence or paragraph in the document, and then set viewing focal area 216 to encompass a predetermined number of characters, words, sentences or paragraphs before and/or after the median character, word, sentence or paragraph.

As another alternative, viewing focal area 216 can be positioned on passive identification interface 200 based on an analysis of content of the computer-based material. For example, if computer-based material 214 comprises a document, viewing focal area 216 can be positioned to encompass sentences or paragraphs of the document that have been displayed on passive identification interface 200 for greater than a certain threshold viewing time limit. Conventional techniques exist to analyze text and identify phrases and sentences in text in a number of different formats. For example, techniques exist to define sentences as sequential groups of words that begin with a capital letter and end with certain types of punctuation.

As another example, when computer-based material 214 comprises a web page or a document (a part of which is text and another part of which is an image(s)) or another viewable item, viewing focal area 216 may encompass five percent of the viewable screen both above and below the invisible horizontal line at the middle of the viewable portion of the web page or document.

According to an exemplary embodiment, the user can change the configuration of viewing focal area 216. For example, the user can increase or decrease the amount of computer-based material 214 present in viewing focal area 216 by respectively increasing or decreasing the size of viewing focal area 216. Further, the user can change the placement of viewing focal area 216 on passive identification interface 200, e.g., so as to adjust to an eye level of the user.

Indicia 220 and 222 are exemplary link indicia configurations that can be employed. As FIG. 2 illustrates, both indicia 220 and 222 can be present in the same document. However, in many applications, displaying both indicia 220 and 222 can be redundant. According to an exemplary embodiment, the user selects whether indicia 220 and/or indicia 222 are displayed. Further, the placement of indicia 220 and 222 shown in FIG. 2 is merely exemplary. For example, indicia 222 can be placed outside of the document, e.g., on another portion of passive identification user interface 200. The placement of the indicia can be dictated by the user, based on his or her preferences.

As described above, indicia 220 and 222 can include information that is useful to the user. As shown in FIG. 2, each of indicia 220 and 222 include an amount of time, "12 min.," indicating that the particular corresponding portion of computer-based material 214 was viewed for 12 minutes. Additionally, the indicia may be color-coded, or in some other way variably coded to indicate the amount of time the user spent viewing the corresponding portion of the document or a level of importance assigned by the user to the corresponding portion of the document.

Control keys 212a-c may be associated with passive identification interface 200. These control keys are optional. Similar control keys are found in various operating systems and their use would be apparent to one of ordinary skill in the art. For example, control key 212a can be selected by the user to "minimize"/"restore" computer-based material 214. Control key 212b can be selected by the user to change the viewable dimensions of, e.g., the scale of, computer-based material 214. Control key 212c can be selected by the user to close computer-based material 214.

FIG. 3 is a diagram illustrating exemplary reference key user interface 308. Reference key user interface 308 comprises items 310, 312 and 314 and control keys 317a, 317b and 317c. As described above, reference key user interface 308 provides the user with an index of computer-based material and attached indicia, and allows the user to return to annotated portions of the computer-based material by selecting specific link indicia. As described above, the indicia can comprise link indicators.

Each item in reference key user interface 308, e.g., items 310, 312 and 314, represents a previously viewed computer-based material, at least a portion of which has been annotated by the user. For example, items 310 and 312, labeled "Web A P.1" and "Web A P.2," respectively, represent the first and second pages of a previously viewed Web page A, and item 314, labeled "Web B P.1," represents the first page of previously viewed Web page B. Further, each item includes at least one indicator associated with portions of interest annotated by the user. For example, item 310 includes indicia 316 and 318, item 312 includes indicia 320 and item 314 includes indicia 322 and 324.

The indicia include information that helps the user identify each annotated portion of the previously viewed material. According to one embodiment, as shown in FIG. 3, each of indicia 316, 318, 320, 322 and 324 includes an indicator of how long the user viewed each annotated portion of the material. For example, indicator 316 indicates that the user previously spent 15 seconds viewing a portion of Web page A. Similarly, indicator 318 indicates that the user also spent 20 seconds viewing another portion of Web page A.

Each item and indicator in reference key user interface 308 provides an active link to the corresponding previously viewed material which the user can activate by selecting any of the indicia in reference key user interface 308, e.g., using a pointing device. Thus, for example, if the user wishes to return to the annotated portion of Web page A that the user spent the most time viewing, the use can simply select indicator 318 in item 310 to link to that previously viewed and annotated portion of Website A. The user would then be returned to the passive identification interface, e.g., passive identification interface 200 described, for example, in conjunction with the description of FIG. 2, above, as it appeared when the user first viewed the annotated portion of the material. For example, the user would be returned to user interface 200 having the contents of Web page A displayed, such that the previously viewed and annotated portion of Web page A is present within viewing focal area 216.

According to one exemplary embodiment, once the user activates/returns to a material via one of the link indicia and is returned to a previously viewed material, reference key user interface 308 remains present on the screen. The user can then use reference key user interface 308 to further select other computer-based material to which to return.

Control keys 317a, 317b and 317c are also associated with reference key user interface 308. Similar to control keys 212a-c described, for example, in conjunction with the description of FIG. 2, above, these control keys are optional and their use would be apparent to one of ordinary skill in the art. Control key 317a can be selected by the user to "minimize"/"restore" reference key user interface 308. Control key 317b can be selected by the user to change the dimensions of, e.g., scale of, reference key user interface 308. Control key 317c can be selected by the user to close reference key user interface 308.

As an alternative to link indicators, other types of indicia are also provided herein that may serve as a "tool bar button," which by way of example only can comprise buttons that are commonly used in several popular computer programs. For example, in one exemplary embodiment, an indicator in the form of a tool bar button returns the user to the most recently viewed portion of interest with the first "click" of the button. A subsequent click of the button would then return the user to the second most recently viewed portion of interest, and so on. Another button could appear allowing the user to navigate "back" to the material that the user was viewing before clicking on the link indicator as just described. In another exemplary embodiment, clicking on the link indicator toolbar button would return the user to a portion of the currently viewed material of greatest interest, as identified through the techniques described above, and subsequent clicks of the link indicator would summon the portion of next greatest interest, and so on. After viewing each identified area of interest in the currently viewed material, a subsequent click of the same button would summon the portion of greatest interest in the next. Additionally, link indicators can be organized according to chronology of their creation, length of time that the corresponding portions of interest were viewed by the user, or by manual reorganization and labeling carried out by the user.

Figure 4:
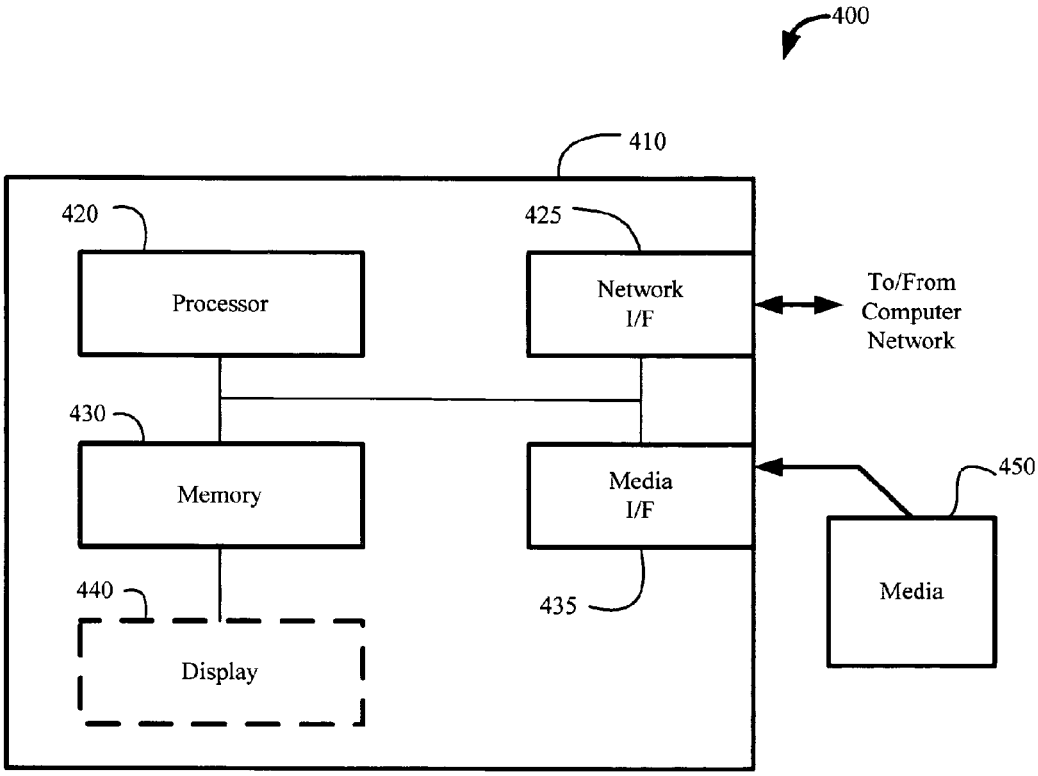
FIG. 4 is a diagram illustrating an exemplary system for performing the present techniques according to an embodiment of the present invention.

Turning now to FIG. 4, a block diagram is shown of an apparatus 400 for processing a computer-based material in accordance with one embodiment of the present invention. It should be understood that apparatus 400 represents one embodiment for implementing methodology 100 of FIG. 1.

Apparatus 400 comprises a computer system 410 and removable media 450. Computer system 410 comprises a processor 420, a network interface 425, a memory 430, a media interface 435 and an optional display 440. Network interface 425 allows computer system 410 to connect to a network, while media interface 435 allows computer system 410 to interact with media such as a hard drive or removable media 450.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to present the computer-based material, determine one or more portions of the computer-based material that are of interest to a user; and annotate the one or more portions to permit return to the one or more portions. The machine-readable medium may be a recordable medium (e.g., floppy disks, hard drive, optical disks such as removable media 450, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor 420 can be configured to implement the methods, steps, and functions disclosed herein. The memory 430 could be distributed or local and the processor 420 could be distributed or singular. The memory 430 could be implemented as an electrical, magnetic or optical memory, or any combination of these or other types of storage devices. Moreover, the term "memory" should be construed broadly enough to encompass any information able to be read from or written to an address in the addressable space accessed by processor 420. With this definition, information on a network, accessible through network interface 425, is still within memory 430 because the processor 420 can retrieve the information from the network. It should be noted that each distributed processor that makes up processor 420 generally contains its own addressable memory space. It should also be noted that some or all of computer system 410 can be incorporated into an application-specific or general-use integrated circuit.

Optional video display 440 is any type of video display suitable for interacting with a human user of apparatus 400. Generally, video display 440 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for processing [a computer-based material], the method comprising [the steps of]:

presenting [the], *by a processing device,* computer-based material [to a user] on a screen;

determining, *by the processing device,* one or more portions of the computer-based material that are of interest to [the] *a* user based [upon identification by the user of] *at least in part on a time* the one or more portions of the computer-based material [when the one or more portions of the computer-based material] are located in a viewing focal area of the screen, wherein [an extent] *the time* or placement of the viewing focal area [can be] *is configured to be* variably set based on user preferences[, or by selection by the user of the one or more portions of the computer-based material]; and

*automatically* annotating, *by the processing device,* the computer-based material with indicia to permit rapid return by one or more hyperlinks to the one or more portions [thereof] *of the computer-based material* that are *identified to be* of interest to the user at a later time.

2. The method of claim 1, wherein the computer-based material includes one or more of files, web pages, documents, data spreadsheets and computer displayable media.

3. The method of claim 1, wherein the one or more portions include one or more of specific areas, scroll positions, navigation positions, lines of text, characters of text, lines of data and characters of data.

4. The method of claim 1, wherein *the determining* the one or more portions of the computer-based material are [determined to be] of interest to the user *is* based on *an indication of* an amount of time the user views the one or more portions *in the viewing focal area*.

5. The method of claim 1, wherein *the determining* the one or more portions of the computer-based material are [determined to be] of interest to the user *is* based on an amount of time the one or more portions are located in the viewing focal area of the screen.

6. The method of claim 1, wherein *the determining* the one or more portions of the computer-based material are [determined to be] of interest to the user *is* based on a number of instances that the one or more portions are located in the viewing focal area of the screen.

7. The method of claim 1, wherein *the determining* the one or more portions of the computer-based material are [determined to be] of interest to the user *is* based on [active] *passive* identification of the one or more portions [by the user].

8. The method of claim 1, wherein the [step of] annotating further comprises [the step of] associating, *by the processing device,* one or more indicia with the one or more portions.

9. The method of claim 1, wherein the [step of] annotating further comprises [the steps of]:

associating, *by the processing device,* one or more indicia with the one or more portions; and ranking, *by the processing device,* the one or more indicia based on when each of the one or more indicia were associated with the one or more portions.

10. The method of claim 1, wherein the [step of] annotating further comprises [the steps of]:

associating, *by the processing device,* one or more indicia with the one or more portions; and ranking, *by the processing device,* the one or more indicia based on an *indication of an* amount of time the user spent viewing the one or more portions.

11. The method of claim 1, further comprising [the steps of]:

associating, *by the processing device,* one or more indicia with the one or more portions; and imposing, *by the processing device,* a maximum viewing time limit beyond which the one or more indicia are removed or modified.

12. The method of claim 1, wherein the one or more portions include one or more of scroll positions, navigation positions, lines of text, characters of text, lines of data and characters of data.

13. The method of claim 1, wherein *the determining* the one or more portions of the computer-based material are [determined to be] of interest to the user *is* based on active identification of the one or more portions located in the viewing focal area by the user.

14. The method of claim 1, wherein *the determining* the one or more portions of the computer-based material [that] are of interest to the user [are determined] *is* based upon active or passive identification [by the user] of the one or more portions of the computer-based material when the one or more portions of the computer-based material are located in a viewing focal area of the screen, wherein an extent or placement of the viewing focal area [can] *is configured to* be variably set based on *an indication of* user preferences, or by selection [by the user] of the one or more portions of the computer-based material.

15. The method of claim 1, wherein the computer-based material comprises a document and wherein the viewing focal area encompasses a middle of a viewable portion of the document.

16. The method of claim 1, wherein the viewing focal area is positioned based on an analysis of content of the computer-based material.

17. The method of claim 1, wherein [the step of] annotating further comprises [the steps of]:

associating, *by the processing device,* one or more indicia with the one or more portions; and organizing, *by the processing device,* the one or more indicia based on an amount of user interest.

18. A *non-transitory* computer [user interface provided on a screen] *readable medium having instructions stored thereon defining at least one program that, when executed by a processing device, cause the processing device to perform actions* comprising:

*providing* a computer-based material;

*defining an extent or placement of* a viewing focal area of [the] *a* screen [encompassing] *configured to display* a portion of the computer-based material, wherein [an] *the* extent or placement of the viewing focal area [can be] *is configured to be* variably set based on user preferences; and

[one or more indicia associated with and annotating] *automatically annotating* the portion of the computer-based material *with indicia* and including one or more hyperlinks permitting rapid return to the one or more portions of the computer-based material that are of interest to the user at a later time*;*

*wherein automatically annotating the portion of the computer-based material occurs in response to the portion of the computer-based material being displayed in the viewing focal area of the screen for a predetermined time*.

19. The [user interface] *non-transitory computer readable medium* of claim 18, wherein the computer-based material comprises one or more of files, web pages, documents, data spreadsheets and computer displayable media.

20. The [user interface] *non-transitory computer readable medium* of claim 18, wherein the viewing focal area has one or more of a user-configurable size and a user-configurable placement.

21. The [user interface] *non-transitory computer readable medium* of claim 18, wherein the one or more indicia are placed on a scroll bar associated with the computer-based material, at one or more positions corresponding with a location of the portion of the computer-based material.

22. The [user interface] *non-transitory computer readable medium* of claim 18, wherein the one or more indicia comprise tags having information [related to] *indicating* an amount of time the portion was viewed by a user.

23. The [user interface] *non-transitory computer readable medium* of claim 18, wherein the one or more indicia comprise tags having information *associated with an* input [by a user].

24. The [user interface] *non-transitory computer readable medium* of claim 18, wherein the one or more indicia comprise tags having chronological information displayed therein the information being related to when the portion was viewed by a user.

25. The [user interface] *non-transitory computer readable medium* of claim 18, wherein the one or more indicia are automatically created when the portion of the computer-based material is presented in the viewing focal area beyond a threshold time limit.

26. The [user interface] *non-transitory computer readable medium* of claim 18, wherein the one or more indicia are automatically created when the portion of the computer-based material is present in the viewing focal area for at least a threshold number of times.

27. The [user interface] *non-transitory computer readable medium* of claim 18, wherein the one or more indicia comprise toolbar buttons that, when activated, are configured to present a next most recently previously annotated portion of the computer-based material.

28. The [user interface] *non-transitory computer readable medium* of claim 18, wherein the one or more indicia comprise toolbar buttons that, when activated, are configured to present a next highly-ranked *previously annotated portion of the computer-based material*, based upon one or more of [length] *lengths* of time viewed and number of instances viewed[, previously annotated portion of the computer-based material].

29. An apparatus for processing a computer-based material, the apparatus comprising:

a memory; and at least one processor, coupled to the memory, [operative] *configured* to:

present the computer-based material [to a user] on a screen;

determine one or more portions of the computer-based material that are of interest to [the] *a* user based [upon] *on an* identification [by the user] of the one or more portions of the computer-based material [when] *based on a time* the one or more portions of the computer-based material are [located] *displayed* in a viewing focal area of the screen, wherein [an extent] *the time the one or more portions of the computer-based material is displayed on the viewing focal area* or placement of the viewing focal area [can be] *within the screen is configured to be* variably set based on user preferences[, or by selection by the user of the one or more portions of the computer-based material]; and

*automatically* annotate the computer-based material with indicia to permit rapid return by one or more hyperlinks to the one or more portions [thereof] *of the computer-based material* that are *identified to be* of interest to the user at a later time.

30. An article of manufacture for processing a computer-based material, comprising a machine readable, non-transitory medium containing one or more programs which when executed implement the steps of:

presenting the computer-based material [to a user] on a screen;

determining one or more portions of the computer-based material that are of interest to [the] *a* user based [upon identification by the user of] *at least in part on a time* the one or more portions of the computer-based material [when the one or more portions of the computer-based material] are located in a viewing focal area of the screen, wherein [an extent] *the time* or placement of the viewing focal area [can be] *within the screen is configured to be* variably set based on user preferences[, or by selection by the user of the one or more portions of the computer-based material]; and

*automatically* annotating, *by the processing device,* the computer-based material with indicia to permit rapid return by one or more hyperlinks to the one or more portions [thereof] *of the computer-based material* that are *identified to be* of interest to the user at a later time.

*31. A method, comprising:*

*identifying, by a processing device, a portion of data visible on a focal viewing area of a display based at least in part on a time parameter associated with the focal viewing area, wherein a location of the focal viewing area within the display or the time parameter associated with the focal viewing area are configured to be variably set;*

*automatically annotating, by the processing device, the portion of the data with indicia based on the selection; and*

*associating, by the processing device, a hyperlink to the indicia to permit rapid return to the portion of the data at a later time.*

*32. The method of claim 31, further comprising setting, by the processing device, the time parameter based on a type of media item comprising the data.*

*33. The method of claim 31, wherein the focal viewing area comprises at least one of predetermined dimensions within the display, a predetermined number of lines of text, characters or images or any combination thereof, a predetermined percentage of an area of the display, or combinations thereof.*

*34. The method of claim 31, wherein the time parameter comprises at least one of a time period for displaying the portion of the data within the focal viewing area of the display or a number of times the portion of the data is displayed within the focal viewing area of the display in a predetermined time period, or combinations thereof.*

*35. The method of claim 31, further comprising modifying, by the processing device, the hyperlink based on the time parameter.*

*36. The method of claim 31, further comprising associating, by the processing device, the portion of the data with indicia configured to indicate supplemental information.*

*37. The method of claim 36, wherein the supplemental information comprises at least one of a time the data was viewed, an amount of time the data was in the focal viewing area of the display, chronological information indicating when the data was in the focal viewing area of the display, information input manually, a rank of the data, a summary of the data, or combinations thereof.*

*38. The method of claim 31 further comprising:*

*monitoring, by the processing device, an amount of time the portion of the data is displayed within the focal viewing area; and*

*identifying the portion of the data based on the amount of time the portion of the data is displayed.*

*39. The method of claim 31 further comprising assigning, by the processing device, a rank to the portion of the data based on the time parameter.*

*40. The method of claim 39 further comprising annotating, by the processing device, the portion of the data to identify the rank.*

*41. The method of claim 31 further comprising displaying, by the processing device, chronological information corresponding to a viewing record of the portion of the data.*

*42. A computer-readable memory device having instructions stored thereon that, in response to execution by a processing device, cause the processing device to perform operations comprising:*

*identifying a portion of data visible on a focal viewing portion of a display of at least a portion of a page based at least in part on a time parameter associated with the focal viewing portion, a location of the focal viewing portion within the display or the time parameter being configured to be variably set;*

*automatically annotating the identified portion of the data with indicia; and*

*associating a hyperlink to the indicia to permit rapid return to the identified portion of the data at a later time.*

*43. The computer-readable memory device of claim 42, wherein the operations further comprise setting the time parameter associated with the focal viewing portion based on a type of media item including the data that is being displayed.*

*44. The computer-readable memory device of claim 42, wherein the focal viewing portion comprises at least one of predetermined dimensions within the display, a predetermined number of lines of text, characters or images or any combination thereof, a predetermined percentage of an area of the display, or combinations thereof.*

*45. The computer-readable memory device of claim 42, wherein the time parameter comprises at least one of a time period for displaying the portion of the data within the focal viewing portion, a number of times the portion of the data is displayed within the focal viewing portion, or combinations thereof.*

*46. The computer-readable memory device of claim 42, wherein the operations further comprise modifying the hyperlink based on the parameter associated with the focal viewing portion.*

*47. The computer-readable memory device of claim 42, wherein the operations further comprise automatically annotating the identified portion of the data with the indicia configured to indicate the hyperlink or supplemental information.*

*48. The computer-readable memory device of claim 47, wherein the supplemental information comprises at least one of a time the data was viewed, an amount of time the data was in the focal viewing portion, chronological information indicating when the data was in the focal viewing portion, information input manually, a rank of the data, and a summary of the data.*

*49. The computer-readable memory device of claim 42, wherein the operations further comprise:*

*monitoring an amount of time any portion of the data is displayed within the focal viewing portion; and*

*identifying the any portion of the data as being of interest to a user based on the amount of time the any portion of the data is displayed in the focal viewing portion.*

*50. The computer-readable memory device of claim 42, wherein the operations further comprise assigning a rank to the portion of the data based on the time parameter.*

*51. The computer-readable memory device of claim 50, wherein the operations further comprise annotating the portion of the data to identify the rank.*

*52. The computer-readable memory device of claim 51, wherein the operations further comprise displaying chronological information corresponding to a viewing record of the identified portion of the data.*

*53. An apparatus, comprising:*

*a memory device configured to store instructions associated with an application program; and*

*a processing device that, in response to executing the instructions stored on the memory device, is configured to:*

*identify a portion of data visible on a viewing focal area of a display by monitoring of a time parameter associated with the viewing focal area of the display;*

*automatically annotate the identified portion of the data with indicia; and*

*associate a hyperlink to the indicia to permit rapid return to the identified portion of the data at a later time;*

*wherein a location of the viewing focal area on the display or the time parameter associated with the viewing focal area of the display is configured to be variably set.*

*54. The apparatus of claim 53, wherein the processing device is further configured to set the time parameter associated with the viewing focal area based on a type of media item including the data.*

*55. The apparatus of claim 53, wherein the viewing focal area comprises at least one of predetermined dimensions within the display, a predetermined number of lines of text, characters or images or any combination thereof, a predetermined percentage of an area of the display, or combinations thereof.*

*56. The apparatus of claim 53, wherein the time parameter comprises at least one of a time period for displaying the data within the viewing focal area, a number of times the data is displayed within the viewing focal area, or combinations thereof.*

*57. The apparatus of claim 53, wherein the processing device is further configured to modify the hyperlink based on the parameter associated with the viewing focal area.*

*58. The apparatus of claim 53, wherein the processing device is further configured to associate the data with indicia configured to indicate supplemental information.*

*59. The apparatus of claim 58, wherein the supplemental information comprises at least one of a time the identified portion of the data was viewed, an amount of time the identified portion of the data was in the viewing focal area, chronological information indicating when the identified portion of the data was in the viewing focal area, information input manually, a rank of the identified portion of the data, a summary of the identified portion of the data, or combinations thereof.*

*60. The apparatus of claim 53, wherein the processing device is further configured to:*

*monitor an amount of time a particular portion of the data is displayed within the viewing focal area; and*

*identify the particular portion of data based on the amount of time the particular portion of the data is displayed within the viewing focal area.*

*61. The apparatus of claim 53, wherein the processing device is further configured to assign a rank to the data based on the time parameter associated with the viewing focal area.*

*62. The apparatus of claim 61, wherein the processing device is further configured to automatically annotate the portion of the data to identify the rank.*

*63. The apparatus of claim 53, wherein the processing device is further configured to display chronological information corresponding to a viewing record of the portion of the data.*

*64. An apparatus comprising:*

*means for identifying a portion of data visible on a focal viewing portion of a display of at least a portion of a page based at least in part on a time parameter associated with the focal viewing portion;*

*means for automatically annotating the portion of the data with indicia; and*

*means for associating a hyperlink to the indicia to permit rapid return to the portion of the data at a later time;*

*wherein a location of the focal viewing portion within the display or the time parameter being configured to be variably set.*

*65. The apparatus of claim 64, further comprising means for setting a location of the focal viewing portion based on a type of media item including the data.*

*66. The apparatus of claim 64, wherein the focal viewing portion comprises at least one of predetermined dimensions within the display, a predetermined number of lines of text, characters or images or any combination thereof, a predetermined percentage of an area of the display, or combinations thereof.*

*67. The apparatus of claim 64, wherein the time parameter comprises at least one of a time period for displaying the data within the viewing focal area, a number of times the data is displayed within the focal viewing portion, or combinations thereof.*

*68. The apparatus of claim 64, further comprising means for modifying the hyperlink based on the time parameter associated with the focal viewing portion.*

*69. The apparatus of claim 64, further comprising means for associating the portion of the data with indicia configured to indicate supplemental information.*

*70. The apparatus of claim 69, wherein the supplemental information comprises at least one of a time the data was viewed, an amount of time the data was in the focal viewing portion, chronological information indicating when the data was in the focal viewing portion, information input manually, a rank of the data, a summary of the data, or combinations thereof.*

*71. The apparatus of claim 64, further comprising:*

*means for monitoring an amount of time the portion of the data is displayed within the focal viewing portion; and*

*means for identifying the portion of the data based on the amount of time the portion of the data is displayed within the focal viewing portion.*

*72. The apparatus of claim 64, further comprising means for assigning a rank to the portion of the data based on the time parameter.*

*73. The apparatus of claim 72, further comprising means for annotating the portion of the data to identify the rank.*

*74. The apparatus of claim 64, further comprising means for displaying chronological information corresponding to a viewing record of the data.*

* * * * *